United States Patent
Lee et al.

(10) Patent No.: US 11,213,140 B2
(45) Date of Patent: Jan. 4, 2022

(54) SYSTEM FOR CORRECTING PASSENGER'S POSTURE IN AUTONOMOUS VEHICLE

(71) Applicants: Hyundai Motor Company, Seoul (KR); KIA Motors Corporation, Seoul (KR)

(72) Inventors: Baek Hee Lee, Gyeonggi-do (KR); Min Hyuk Kwak, Seoul (KR); Jin Hee Lee, Gyeonggi-do (KR)

(73) Assignees: Hyundai Motor Company, Seoul (KR); KIA Motors Corporation, Seoul (KR)

(*) Notice: Subject to any disclaimer, the term of this patent is extended or adjusted under 35 U.S.C. 154(b) by 462 days.

(21) Appl. No.: 16/201,299

(22) Filed: Nov. 27, 2018

(65) Prior Publication Data

US 2020/0093279 A1    Mar. 26, 2020

(30) Foreign Application Priority Data

Sep. 21, 2018  (KR) .......................... 10-2018-0113391

(51) Int. Cl.
*A47C 31/12*        (2006.01)
*B60N 2/02*         (2006.01)
(Continued)

(52) U.S. Cl.
CPC ......... *A47C 31/126* (2013.01); *A61H 9/0078* (2013.01); *B60N 2/0244* (2013.01);
(Continued)

(58) Field of Classification Search
CPC .................. A61H 9/00; A61H 2230/62; A61H 2230/625; A61H 2230/85;
(Continued)

(56) References Cited

U.S. PATENT DOCUMENTS

2004/0220705 A1*  11/2004  Basir ................. B60R 21/01538
                                                      701/1
2013/0116852 A1*   5/2013  Dijk ........................ G06F 3/011
                                                      700/301
(Continued)

FOREIGN PATENT DOCUMENTS

JP          2009274480 A      11/2009
JP          2018055469 A       4/2018
(Continued)

*Primary Examiner* — Colin W Stuart
*Assistant Examiner* — Douglas Y Sul
(74) *Attorney, Agent, or Firm* — Lempia Summerfield Katz LLC

(57) ABSTRACT

Disclosed is a system for correcting a passenger's posture in an autonomous vehicle, wherein the system includes a camera configured to measure a distance between a headrest and a head of the passenger, a plurality of body pressure sensors configured to be uniformly embedded across an entire area of the seat and sense body pressures of the passenger, a pressurizing device configured to be expandably installed inside a seatback and press between T10 and T12 of a thoracic spine of the passenger, and a controller configured to control an operation of the pressurizing device on the basis of the distance measured by the camera and a scapular pressure of the passenger, which is sensed by the plurality of body pressure sensors.

12 Claims, 11 Drawing Sheets

(51) Int. Cl.
*B60N 2/66* (2006.01)
*A61H 9/00* (2006.01)
*B60W 50/00* (2006.01)
*G05D 1/02* (2020.01)

(52) U.S. Cl.
CPC .............. *B60N 2/665* (2015.04); *B60N 2/666* (2015.04); *A61H 2201/0149* (2013.01); *A61H 2201/5071* (2013.01); *A61H 2201/5092* (2013.01); *A61H 2230/625* (2013.01); *B60N 2002/026* (2013.01); *B60N 2002/0268* (2013.01); *B60W 50/0098* (2013.01); *G05D 1/021* (2013.01); *G05D 2201/0213* (2013.01)

(58) Field of Classification Search
CPC ...... A61H 2230/855; A61H 2201/5071; A61H 2201/0149; A61H 2203/0431; B60N 2/665; B60N 2/666; B60N 2/0244; B60N 2/64; B60N 2002/0268; B60N 2002/026; A47C 31/126; B50W 50/0098
See application file for complete search history.

(56) References Cited

U.S. PATENT DOCUMENTS

| | | | | |
|---|---|---|---|---|
| 2015/0352990 | A1* | 12/2015 | Zouzal | B60N 2/99 297/284.3 |
| 2015/0366350 | A1* | 12/2015 | Di Censo | G05B 13/04 700/275 |
| 2017/0334451 | A1* | 11/2017 | Asakura | B60W 10/20 |
| 2018/0178694 | A1* | 6/2018 | McMillen | B60N 2/666 |
| 2018/0185234 | A1* | 7/2018 | Ishiguro | A61H 23/006 |
| 2018/0304774 | A1* | 10/2018 | Mizoi | A61B 5/7455 |
| 2019/0248260 | A1* | 8/2019 | Yoshikawa | B60N 2/2222 |
| 2019/0299831 | A1* | 10/2019 | Rosero | A61H 9/0078 |
| 2020/0170882 | A1* | 6/2020 | Park | A61H 7/007 |

FOREIGN PATENT DOCUMENTS

| | | |
|---|---|---|
| JP | 2018095015 A | 6/2018 |
| KR | 1019990058660 | 7/1999 |
| KR | 101625651 B1 | 5/2016 |

* cited by examiner

[FIG. 1]
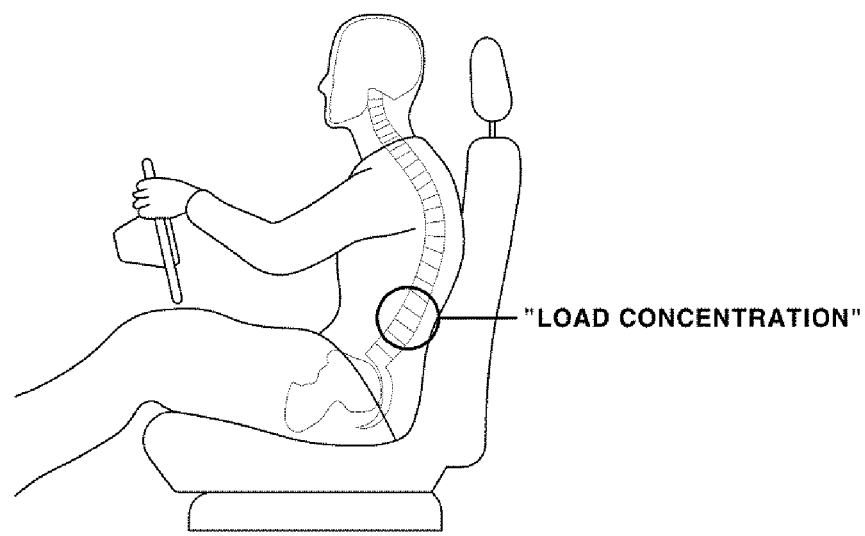
- SLOUCHED-SITTING POSTURE CAUSING BACK PAIN -

[FIG. 2]
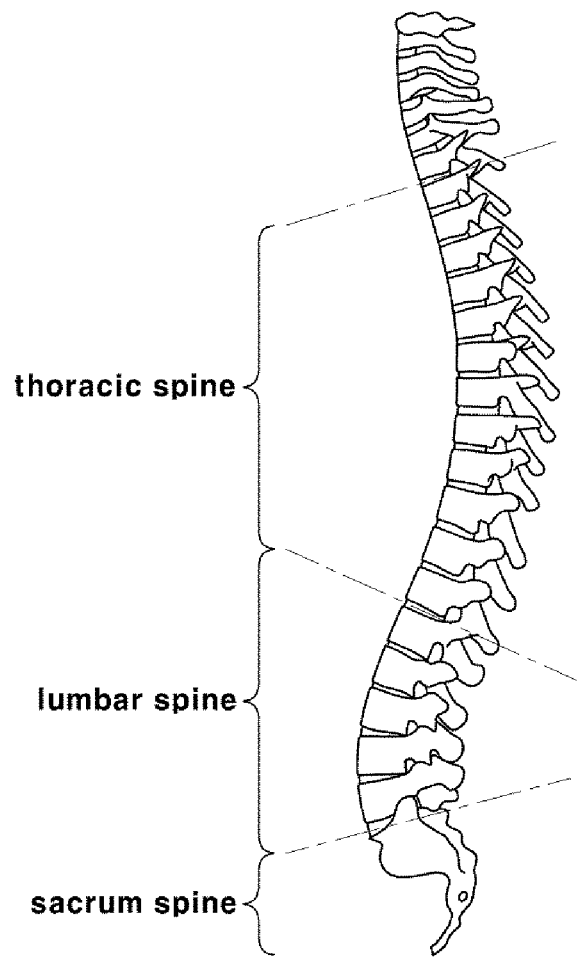

[FIG. 3]
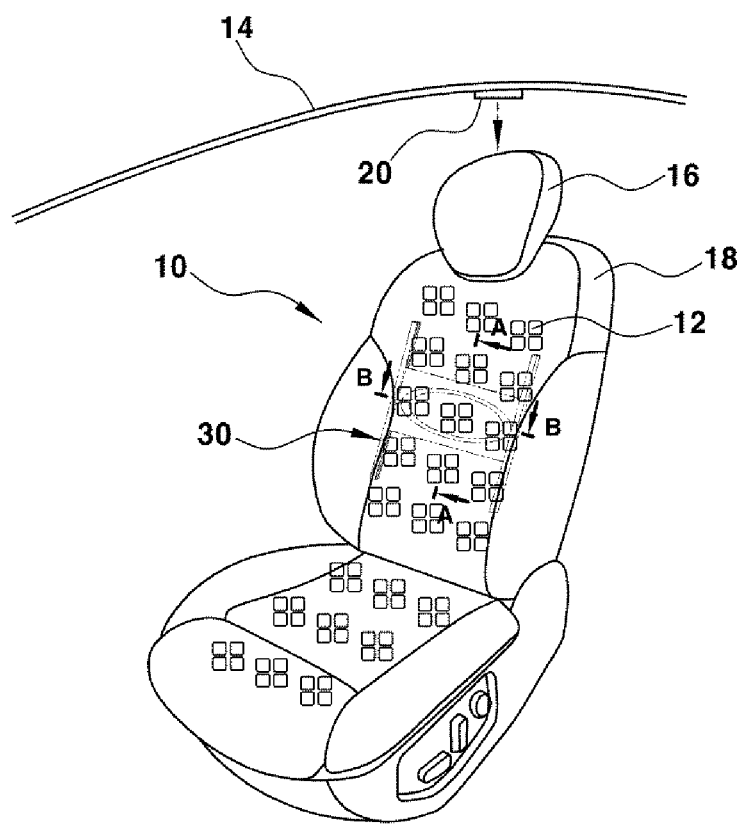

[FIG. 4A]
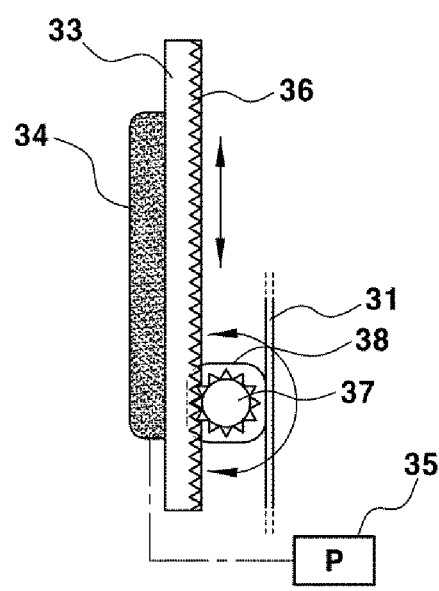

[FIG. 4B]
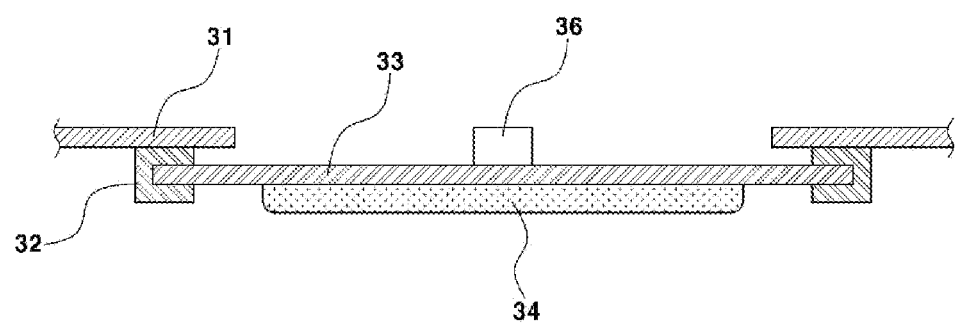

[FIG. 5]
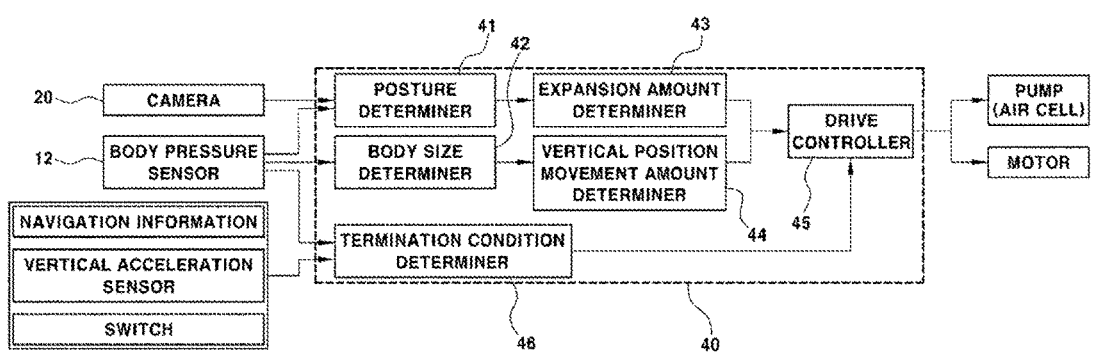

[FIG. 6]
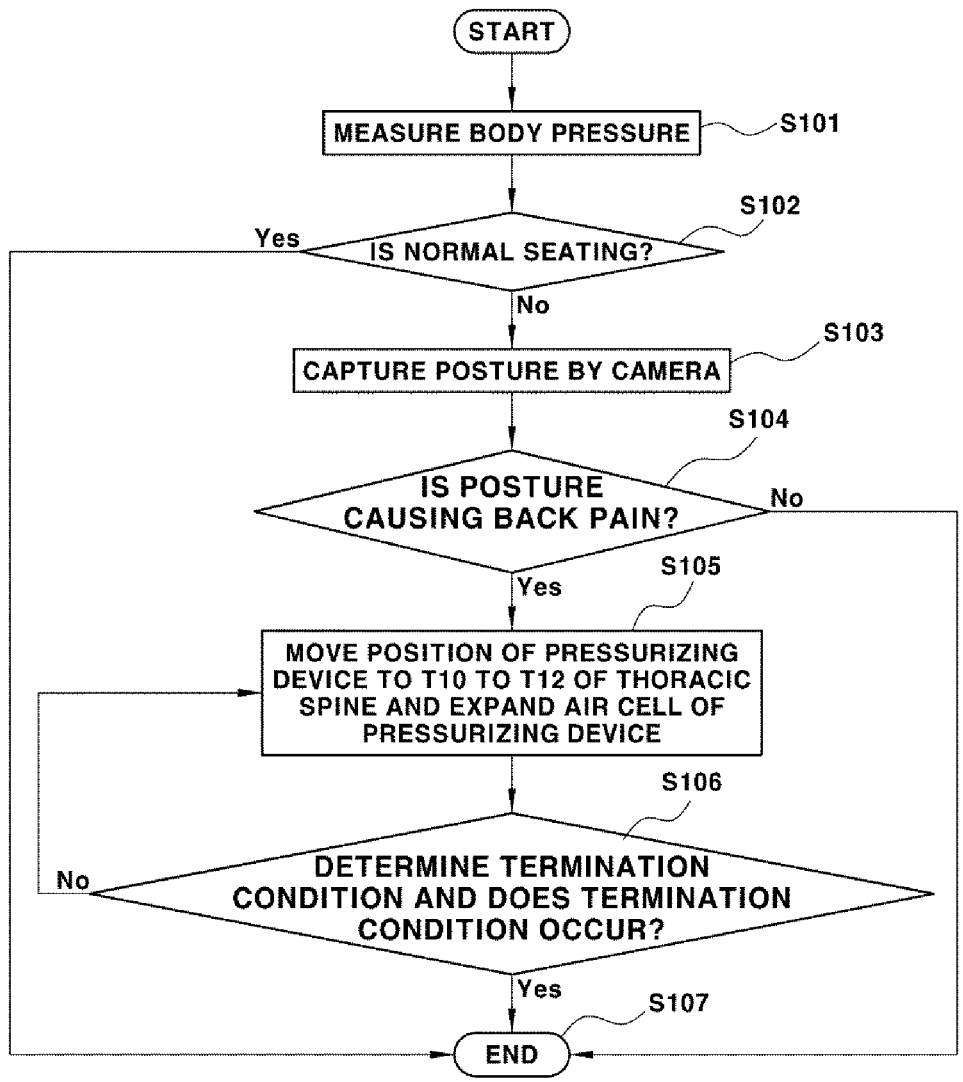

[FIG. 7]
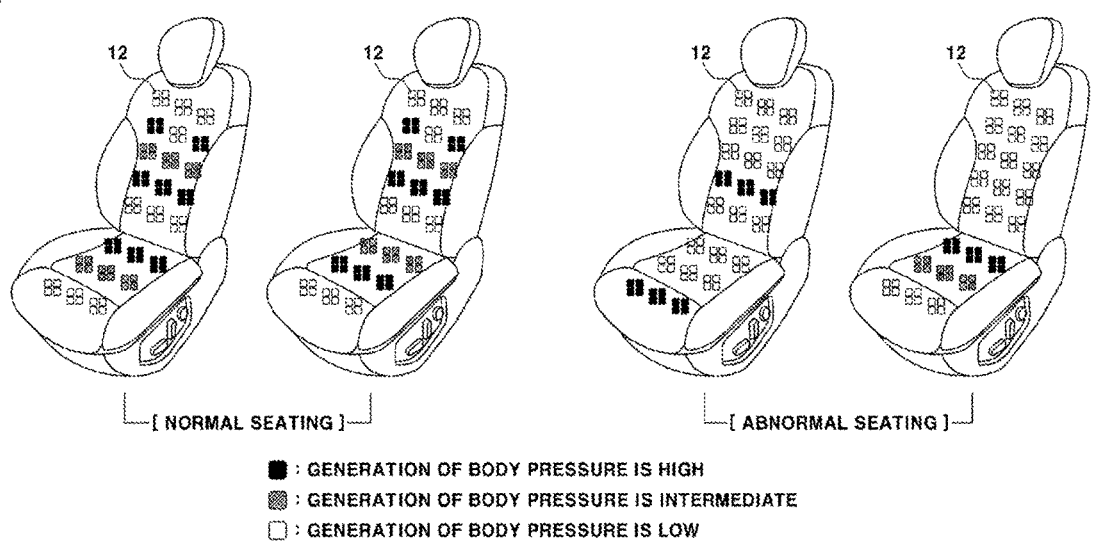

[FIG. 8]
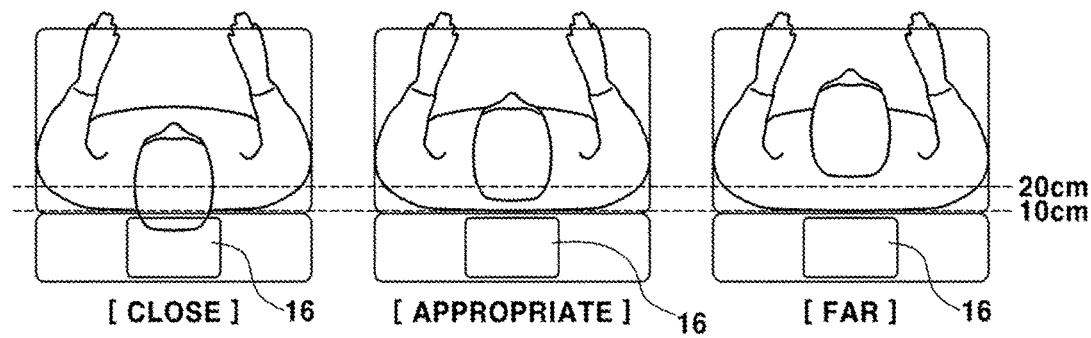

[FIG. 9]
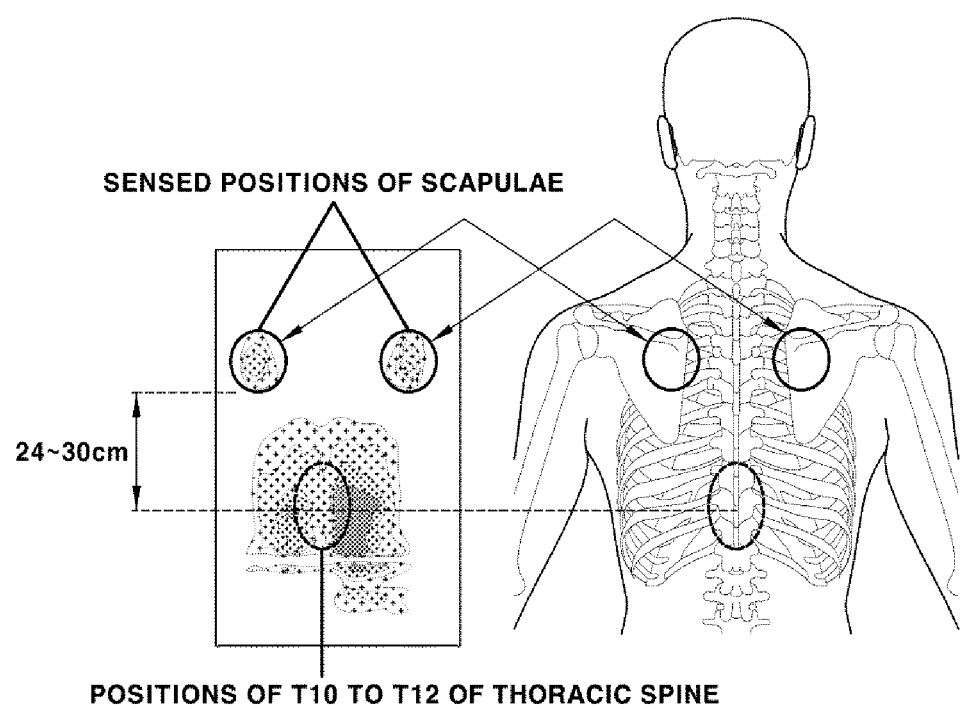

[FIG. 10]
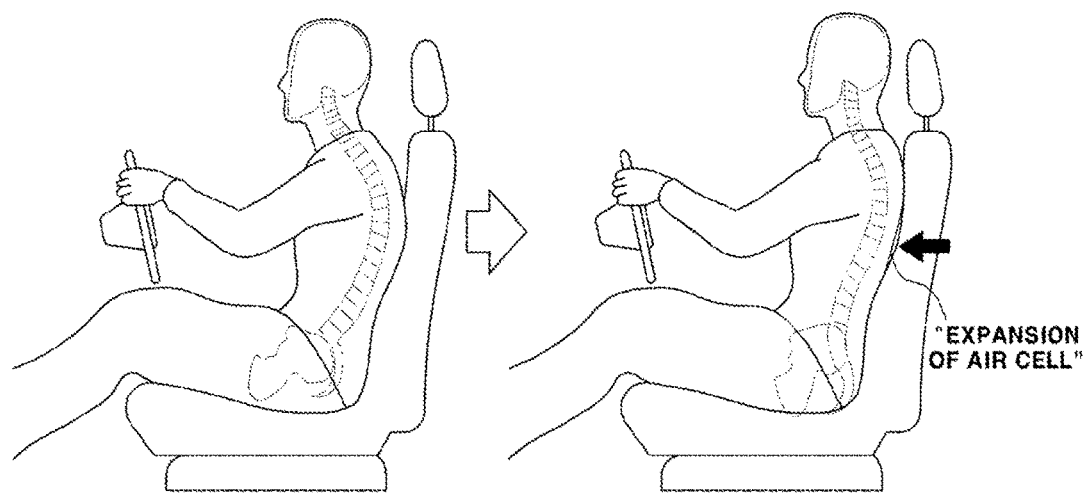

SYSTEM FOR CORRECTING PASSENGER'S POSTURE IN AUTONOMOUS VEHICLE

CROSS-REFERENCE TO RELATED APPLICATION

This application claims priority to and the benefit of Korean Patent Application No. 10-2018-0113391 filed on Sep. 21, 2018, the entire contents of which are incorporated herein by reference.

FIELD

The present disclosure relates to a system for correcting a passenger's posture in an autonomous vehicle.

BACKGROUND

The statements in this section merely provide background information related to the present disclosure and may not constitute prior art.

In the case of an autonomous vehicle capable of driving without control of a driver, passengers as well as the driver aboard in the autonomous vehicle can take various desired postures for multilateral meetings and conversations, outside scenery viewing, reading, relaxation, sleeping, and the like in a state of sitting on seats.

When the passengers are traveling a long distance for a long period of time in the state of sitting on the seats, various postures causing back pain may be taken, and particularly, there occurs a phenomenon of discomfort such as back pain and the like due to a slouched-sitting posture.

Accordingly, when the driver and the passengers are traveling a long distance for a long period of time, it may be desirable to detect a posture of each of the driver and the passengers and induce an upright posture capable of alleviating the back pain.

The above information disclosed in this Background section is only for enhancement of understanding of the background of the disclosure and therefore it may contain information that does not form the prior art that is already known to a person of ordinary skill in the art.

SUMMARY

In one aspect, the present disclosure provides a system for correcting a passenger's posture in an autonomous vehicle, which is capable of detecting a slouched-sitting posture, which may cause back pain in a state in which a passenger is sitting on a seat, using a body pressure sensor, a camera, and the like, and then inducing the slouched-sitting posture into a correct and upright posture which may alleviate the back pain.

In one aspect, a system for correcting a passenger's posture in an autonomous vehicle, the system including a camera configured to measure a distance between a headrest and a head of a passenger, a plurality of body pressure sensors configured to be uniformly embedded across an entire area of a seat and sense body pressures of the passenger, a pressurizing device configured to be expandably installed inside a seatback and press between T10 and T12 of a thoracic spine of the passenger, and a controller configured to control an operation of the pressurizing device on the basis of the distance measured by the camera and a scapular pressure of the passenger, which is sensed by the plurality of body pressure sensors.

The camera may be installed at a position of a head lining, which corresponds to an upper side of the seat.

The pressurizing device may include a pair of rails configured to be installed at a seat back frame, a support plate configured to be vertically movably installed at the pair of rails, an air cell configured to be expandably installed at a front surface of the support plate, and a pump configured to supply air to the air cell and suction the air from the air cell.

A rack may be installed at a rear surface of the support plate, and a motor having a gear, which is engaged with the rack, as a shaft is installed at the seat back frame.

The controller may act as, or may include a processor configured to carry out such functions as, a posture determiner configured to determine whether a current posture of the passenger is a slouched-sitting posture on the basis of a signal for the distance measured by the camera and signals for the body pressures measured by the plurality of body pressure sensors; a body size determiner configured to determine a body type of the passenger on the basis of a signal for a body pressure of a body pressure sensor which measures a scapular pressure of the passenger among the plurality of body pressure sensors; an expansion amount determiner configured to determine an expansion amount of the pressurizing device when the current posture of the passenger is determined as the slouched-sitting posture as the determination result of the posture determiner; a vertical position movement amount determiner configured to determine a vertical position movement distance of the pressurizing device on the basis of the body type determination result of the body size determiner; and a drive controller configured to drive the pressurizing device according to the expansion amount of the pressurizing device determined by the expansion amount determiner, and the vertical position movement amount determined by the vertical position movement amount determiner.

When the distance measured by the camera is out of a predetermined range and the scapular pressure of the passenger sensed by the body pressure sensor is less than or equal to a predetermined body pressure range, or the distance measured by the camera falls within the predetermined range and the scapular pressure of the passenger sensed by the body pressure sensor is less than or equal to the predetermined body pressure range, the posture determiner may determine the current posture of the passenger as the slouched-sitting posture.

The body size determiner may determine a sitting height of the passenger from a generation position of the signal for the body pressure of the body pressure sensor measuring the scapular pressure of the passenger among the plurality of body pressure sensors, and then the body size determiner may determine that T10 to T12 of the thoracic spine of the passenger are present at positions in a range of 24 cm to 30 cm downward from the generation position of the signal for the body pressure of the body pressure sensor.

The controller may further include a termination condition determiner configured to determine whether a process of correcting the passenger's posture is completed.

The termination condition determiner may receive a signal of a vertical acceleration sensor and navigation information, and when a driving state including a severe road driving or a repeated turning are recognized, the termination condition determiner may transmit a command signal to the drive controller to terminate the process of correcting the passenger's posture or contract an expanded air cell of the pressurizing device to its original position.

When a time for the air cell of the pressurizing device, which is expanded to press between T10 and T12 of the thoracic spine of the passenger, is greater than or equal to a predetermined time, the termination condition determiner may transmit a command signal to the drive controller to contract an expanded air cell of the pressurizing device to its original position.

After the air cell of the pressurizing device is expanded to press between T10 to T12 of the thoracic spine of the passenger and the posture of the passenger is corrected to a posture capable of alleviating the back pain, and then a certain period of time is elapsed, the termination condition determiner transmits a command signal to the drive controller to contract an expanded air cell of the pressurizing device to its original position.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a schematic view illustrating an example of a posture which causes back pain when a passenger is traveling long distance for a long period of time in a state of sitting on a seat;

FIG. 2 is a schematic view illustrating a spinal model;

FIG. 3 is a configurational diagram illustrating a system for correcting a passenger's posture in an autonomous vehicle;

FIGS. 4A and 4B are cross-sectional views taken along the line A-A and the line B-B of FIG. 3, respectively;

FIG. 5 is a block diagram illustrating a controller of the system for correcting a passenger's posture in an autonomous vehicle;

FIG. 6 is a flowchart illustrating an operation of the system for correcting a passenger's posture in an autonomous vehicle;

FIG. 7 is a schematic view illustrating an example of sensing by a body pressure sensor of the system for correcting a passenger's posture in an autonomous vehicle;

FIG. 8 is a schematic view illustrating an example of measuring a distance a passenger and a headrest by a camera of the system for correcting a passenger's posture in an autonomous vehicle;

FIG. 9 is a schematic view illustrating an example of sensing a scapular pressure by a body pressure sensor of the system for correcting a passenger's posture in an autonomous vehicle; and FIG. 10 is a schematic diagram illustrating an example of correcting a passenger's posture to a posture which alleviates back pain by an operation of the system for correcting a passenger's posture in an autonomous vehicle.

It should be understood that the appended drawings are not necessarily to scale, in some cases presenting a somewhat simplified representation of various features. The specific design features of the present disclosure as disclosed herein, including, for example, specific dimensions, orientations, locations, and shapes will be determined in part by the particular intended application and use environment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 2, the spine of a human body includes a thoracic spine extending over the back, a lumbar spine extending over the waist, and a sacrum spine between the lumbar spine and the pelvis.

Generally, when a person is sitting on a chair, the spine becomes an arch shape from T10 to T12 constituting the thoracic spine while an upper body of the person maintains an upright state and thus a load acting on the lumbar spine is decreased such that back pain may be alleviated.

Meanwhile, when a person is sitting on a chair and the head and upper body of the person are inclined forward, a load supporting force of the thoracic spine of the spine decreases and, simultaneously, the load is concentrated on the lumbar spine such that back discomfort or pain may be caused.

Referring to FIG. 1, the head and upper body are inclined forward when the passenger is traveling for a long period of time in a state of sitting on a seat, and thus a load supporting force of the thoracic spine of the spine decreases and, simultaneously, the load is concentrated on the lumbar spine such that in back discomfort or pain may be caused.

Accordingly, the present disclosure has a feature of correcting a slouched-sitting posture of bad postures of a passenger, which causes back pain when the passenger is traveling for a long period of time in a state of sitting on a seat, to a correct and upright posture which alleviates the back pain.

FIG. 3 is a configurational diagram illustrating a system for correcting a passenger's posture in an autonomous vehicle according to the present disclosure, and FIGS. 4A and 4B are cross-sectional views taken along the line A-A and the line B-B of FIG. 3, respectively.

As shown in FIG. 3, a plurality of body pressure sensors 12 for sensing a body pressure of a passenger are embedded in an entire area of the seat 10.

In one form, the plurality of body pressure sensors 12 are attached to a flexible mat at predetermined intervals in horizontal and vertical directions and are disposed between a seat cover and a foam pad.

Further, a camera 20 is installed at a head lining 14 corresponding to an upper side of the seat 10 to measure a distance between the head of the passenger and a headrest 16.

Specifically, a pressurizing device 30 is expandably installed inside a seat back 18 supporting the upper body of the passenger to press between T10 to T12 of a thoracic spine of the passenger.

Referring to FIGS. 4A and 4B illustrating one aspect of the pressurizing device 30, a pair of rails 32 are installed at two seat back frames 31 in the vertical direction, and both end portions of a support plate 33, each of which has a predetermined area, are vertically movably inserted into the pair of rails 32.

In this case, an air cell 34 is expandably contractibly installed at a front surface of the support plate 33, and a pump 35 is connected to the air cell 34 to supply air to the air cell 34 or suction the air therefrom.

A rack 36 is vertically disposed and installed at a rear surface of the support plate 33 to provide a driving force for a vertical movement of the support plate 33, and a motor 38 having a gear 37, which is engaged with the rack 36, as an output shaft is installed at a predetermined position of the seat back frame 31.

Accordingly, a controller 40 controls a movement and an expansion amount of the air cell 34 of the pressurizing device 30 on the basis of a signal for a distance between the headrest 16 and the head of the passenger, which is measured by the camera 20, and a scapular pressure sensed by the body pressure sensor 12.

For example, when the controller 40 receives the distance signal between the headrest 16 and the head of the passenger, which is measured by the camera 20, and a scapular pressure sensed by the body pressure sensor 12, and a posture of the passenger sitting on the seat 10 is determined as a slouched-sitting posture, the controller 40 controls the air cell 34 of the pressurizing device 30 to be expanded and T10 to T12 of the thoracic spine of the passenger are pressed by the expansion of the air cell 34 such that the spine of the passenger may be corrected to a upright state.

Hereinafter, a configuration of the controller 40 will be described with reference to a control configuration diagram of FIG. 5.

The controller 40 may act as, or may include a processor that is configured to carry out such functions as, a posture determiner 41 for determining whether a current posture of the passenger is a slouched-sitting posture which may cause back pain; a body size determiner 42 for determining a body type of the passenger; an expansion amount determiner 43 for determining an expansion amount of the air cell 34 of the pressurizing device 30; a vertical position movement amount determiner 44 for determining a vertical position movement distance of the pressurizing device 30; and a drive controller 45 for controlling driving of the pump 35 and the motor 38 of the pressurizing device 30.

The posture determiner 41 primarily determines whether the current posture of the passenger is a normal seating posture or an abnormal seating posture on the basis of a signal for the body pressure measured by the body pressure sensor 12.

For example, as shown in a left side of FIG. 7, when a body pressure distribution measured by the body pressure sensor 12, i.e., a hip body pressure acting on a seat cushion, and a waist pressure and a scapular pressure of the upper body of the passenger, which act on the seat back 18, are evenly distributed at a predetermined level, the posture determiner 41 determines the current posture of the passenger as being a normal seating posture.

In contrast, as shown in a right side of FIG. 7, when the body pressure distribution measured by the body pressure sensor 12, i.e., the hip body pressure acting on the seat cushion, and the waist pressure and the scapular pressure of the upper body of the passenger, which act on the seat back 18, are unevenly distributed, the posture determiner 41 determines the current posture of the passenger as being an abnormal seating posture (slouched-sitting posture).

Further, in order to determine more accurately whether the current posture of the passenger is the abnormal seating posture (slouched-sitting posture), the posture determiner 41 determines whether the current posture of the passenger is the slouched-sitting posture which may cause back pain on the basis of the signal for the distance signal between the headrest 16 and the head of the passenger, which is measured by the camera 20, in addition to the signal for the body pressure measured by the body pressure sensor 12.

More specifically, when the distance between the headrest 16 and the head of the passenger, which is measured by the camera 20, is out of a predetermined range (e.g., in the range of 10 cm to 20 cm) and the scapular pressure of the passenger, which is measured by the body pressure sensor 12, falls within a predetermined body pressure range (e.g., in the range of 5% to 15% relative to a total body pressure) or is less than the predetermined body pressure range (e.g., less than 5%), or the distance measured by the camera 20 falls within the predetermined range (e.g., in the range of 10 cm to 20 cm) and the scapular pressure of the passenger, which is measured by the body pressure sensor 12, fall within the predetermined body pressure range (e.g., in the range of 5% to 15% relative to the total body pressure) or is less than the predetermined body pressure range (e.g., less than 5%), the posture determiner 41 determines the current posture of the passenger as a slouched-sitting posture, which may cause back pain of the passenger, among abnormal postures.

In this case, the camera 20 measures the distance between the headrest 16 and the head of the passenger and transmits the measured distance to the posture determiner 41 of the controller 40, and as shown in FIG. 7, when the measured distance less than 10 cm, the posture determiner 41 determines the measured distance as a close distance, and when the measured distance falls within the predetermined range of 10 cm to 20 cm, the posture determiner 41 determines the measured distance as an appropriate distance, and when the measured distance exceeds 20 cm, the posture determiner 41 determines the measured distance as a far distance.

The body size determiner 42 determines a body type of the passenger on the basis of the signal for the body pressure of the body pressure sensor 12 which measures the scapular pressure of the passenger among the plurality of body pressure sensors 12.

The body size determiner 42 determines a sitting height of the passenger from a generation position of the signal for the body pressure of the body pressure sensor 12 measuring the scapular pressure of the passenger among the plurality of body pressure sensors 12, and then the body size determiner 42 determines that T10 to T12 of the thoracic spine of the passenger are present at positions in the range of 24 cm to 30 cm downward from the generation position of the signal for the body pressure of the body pressure sensor 12.

For example, as shown in FIG. 9, when a sitting height of a passenger is short, the body size determiner 42 determines that T10 to T12 of the thoracic spine of the passenger are present at positions apart 24 cm downward from the generation position of the signal for the body pressure of the body pressure sensor 12, and when a sitting height of a passenger falls within an intermediate range, the body size determiner 42 determines that T10 to T12 of the thoracic spine of the passenger are present at positions apart 27 cm downward from the generation position of the signal for the body pressure of the body pressure sensor 12, and when a sitting height of a passenger is long, the body size determiner 42 determines that T10 to T12 of the thoracic spine of the passenger are present at positions apart 30 cm downward from the generation position of the signal for the body pressure of the body pressure sensor 12.

Meanwhile, when a signal for which the current posture of the passenger is determined as the slouched-sitting posture causing back pain is received from the posture determiner 41, the expansion amount determiner 43 determines an expansion amount for the air cell 34 of the pressurizing device 30.

When a body type determination signal is received from the body size determiner 42, the vertical position movement amount determiner 44 determines an upward or downward movement distance (a distance to positions at which T10 to T12 of the thoracic spine of the passenger are present) of the support plate 33 vertically moving along the pair of rails 32 of the pressurizing device 30.

Further, the drive controller 45 controls the pump 35 to be driven according to an expansion amount of the air cell 34, which is determined by the expansion amount determiner 43, and controls the motor 38 to be driven according to a vertical position movement amount determined by the vertical position movement amount determiner 44.

Hereinafter, an operation flow of the system for correcting a passenger's posture, which has the above-described configuration, will be described.

FIG. 6 is a flowchart illustrating an operation of the system for correcting a passenger's posture in an autonomous vehicle according to the present disclosure.

First, in a state in which a passenger is sitting on the seat 10, the body pressure sensor 12 measures a body pressure (S101).

Then, the posture determiner 41 of the controller 40 receives a signal for the body pressure measured by the body pressure sensor 12 and primarily determines whether the current posture of the passenger is a normal seating posture or an abnormal seating posture (S102).

For example, as shown in a right side of FIG. 7, when the body pressure distribution measured by the body pressure sensor 12, i.e., the hip body pressure acting on the seat cushion, and the waist pressure and the scapular pressure of the upper body of the passenger, which act on the seat back 18, are unevenly distributed, the posture determiner 41 determines the current posture of the passenger as being an abnormal seating posture (slouched-sitting posture).

At this point, the camera 20 measures a distance between the headrest 16 and the head of the passenger (S103).

Next, in order to determine more accurately whether the current posture of the passenger is the abnormal seating posture (slouched-sitting posture), the posture determiner 41 receives a signal for the distance between the headrest 16 and the head of the passenger, which is measured by the camera 20, in addition to the signal for the body pressure measured by the body pressure sensor 12, and determines whether the current posture of the passenger is the slouched-sitting posture which may cause back pain on the basis of (S104).

Then, the body size determiner 42 determines a sitting height of the passenger from a generation position of the body pressure signal of the body pressure sensor 12 measuring the scapular pressure of the passenger among the plurality of body pressure sensors 12, and then the body size determiner 42 determines that T10 to T12 of the thoracic spine of the passenger are present at positions in the range of 24 cm to 30 cm downward from a generation position of the signal for the body pressure of the body pressure sensor 12.

Then, when a signal for which the current posture of the passenger is determined as the slouched-sitting posture is received from the posture determiner 41, the expansion amount determiner 43 determines an expansion amount for the air cell 34 of the pressurizing device 30.

At this point, the expansion amount determiner 43 may receive information on the distance between the headrest 16 and the head of the passenger and generation ratio information on the scapular pressure of the passenger from the posture determiner 41 and may determine the expansion amount of the air cell 34 by classifying the expansion amount into high (an elevated or a maximum air supply to the air cell 34), intermediate (an intermediate air supply to the air cell 34), and low (a reduced or a minimum air supply to the air cell 34) as shown in the following Table 1.

TABLE 1

Condition for determining bent posture

| No. | Distance between headrest and head of seating passenger | Generation ratio of scapula at seat back | Operation (Fail-Safe) | Application Level |
|---|---|---|---|---|
| 1 | less than 10 | less than 5 | o | low |
| 2 | less than 10 | 5 to 15 | x | — |
| 3 | less than 10 | exceed 15 | x | — |
| 4 | 10 to 20 | less than 5 | o | intermediate |
| 5 | 10 to 20 | 5 to 15 | o | low |
| 6 | 10 to 20 | exceed 15 | x | — |
| 7 | exceed 20 | less than 5 | o | high |
| 8 | exceed 20 | 5 to 15 | o | intermediate |
| 9 | exceed 20 | exceed 15 | x | — |

For example, as shown in Table 1, when a generation ratio of a scapular pressure relative to a total body pressure is less than 5% even though a distance between the headrest 16 and the head of the passenger is less than 10 cm, the expansion amount determiner 43 determines the thoracic spine as being slightly bent to determine an expansion amount of the air cell 34 as low (a reduced or a minimum air supply to the air cell 34).

As another example, when the generation ratio of a scapular pressure relative to a total body pressure is less than 5% even though the distance between the headrest 16 and the head of the passenger falls within the predetermined range of 10 cm to 20 cm, the expansion amount determiner 43 determines the thoracic spine as being slightly bent to determine the expansion amount of the air cell 34 as intermediate (an intermediate air supply to the air cell 34).

As still another example, when the generation ratio of a scapular pressure relative to a total body pressure is less than 5% even though the distance between the headrest 16 and the head of the passenger exceeds 20 cm, the expansion amount determiner 43 determines the thoracic spine as being slightly bent to determine the expansion amount of the air cell 34 as high (an elevated or a maximum air supply to the air cell 34).

As described above, the expansion amount of the air cell 34 may be determined by classifying into various cases dividing the air cell expansion amount into various cases on the basis of the distance between the headrest 16 and the head of the passenger and the generation ration of the scapular pressure relative to the total body pressure.

Further, when a body type determination signal is received from the body size determiner 42, the vertical position movement amount determiner 44 determines a movement distance (a distance to positions at which T10 to T12 of the thoracic spine of the passenger are present) of the support plate 33 vertically moving along the pair of rails 32 of the pressurizing device 30.

Then, the drive controller 45 controls the pump 35 to be driven according to the expansion amount of the air cell 34, which is determined by the expansion amount determiner 43, and controls the motor 38 to be driven according to a vertical position movement amount determined by the vertical position movement amount determiner 44 (S105).

Consequently, the gear 37 engaged with the output shaft of the motor 38 is rotated by the driving of the motor 38, and a rotational force is transmitted to the rack 36 formed at the rear surface of the support plate 33 such that the support plate 33 to which the air cell 34 is attached is moved to positions, at which T10 to T12 of the thoracic spine of the passenger are present, along the pair of rails 32.

Next, as shown in FIG. 10, the air cell 34 is expanded by the driving of the pump 35 to press the portion at which T10 to T12 of the thoracic spine of the passenger are present such that the current posture of the passenger may be naturally corrected to a posture for which the spine of the passenger is to be upright (a posture for alleviating back pain).

Meanwhile, when the air cell 34 is expanded to press the portion at which T10 to T12 of the thoracic spine of the passenger are present, the current posture of the passenger may be naturally corrected to the posture for which the spine of the passenger is to be upright, but when a pressurization time due to the expansion by the air cell 34 continues, the passenger may feel discomfort, and when a vehicle is running on a driving road with severe vehicle body vibration, the back of the passenger may interfere with the expanded air cell 34 and thus the passenger may feel discomfort such that it may become desirable to terminate the above-described process of correcting the passenger's posture.

To this end, as shown in FIG. 5, the controller 40 further includes a termination condition determiner 46 for determining whether the process of correcting the passenger's posture is completed.

The termination condition determiner 46 receives a signal of a vertical acceleration sensor and navigation information and determines a termination condition for recognizing a driving state including a severe road driving or a repeated turning (S106).

Accordingly, during the severe road driving or the repeated turning, since a posture variation such as inclination of the passenger to one side due to vehicle body vibration may occur, the back of the passenger may interfere with the expanded air cell 34 and thus the passenger may feel discomfort, the termination condition determiner 46 transmits a command signal to the drive controller 45 to terminate the process of correcting the passenger's posture or contract the expanded air cell 34 to its original position (S107).

Thus, the pump 35 is reversely driven by the command signal from the drive controller 45, air in the air cell 34, and the air cell 34 is contracted to its original position such that the discomfort due to the interference with the air cell 34 can be resolved.

Alternatively, when a time for the expanded air cell 34 to press between T10 to T12 of the thoracic spine of the passenger is greater than or equal to a predetermined time, the termination condition determiner 46 may also transmit the command signal to the drive controller 45 to contract the expanded air cell 34 to its original position.

That is, since the passenger may feel discomfort when T10 to T12 of the thoracic spine of the passenger are pressed over the predetermined time, the pump 35 is reversely driven by the command signal from the drive controller 45 to discharge the air in the air cell 34 and contract the air cell 34 to its original position such that the discomfort may be resolved.

As described above, when a posture of a passenger is determined as a slouched-sitting posture, which may cause back pain while the passenger is traveling for a long period of time in a state of sitting on a seat, the posture of the passenger is corrected to an upright posture capable of alleviating the back pain such that the back pain can be alleviated while the passenger is traveling for a long period of time and a comfort property of the seat can be improved.

According to the present disclosure, when a posture of a passenger sitting on a seat is determined as a slouched-sitting posture, which may cause back pain, the posture of the passenger is corrected to an upright posture capable of alleviating the back pain such that the back pain can be alleviated while the passenger is traveling for a long period of time and a comfort property of the seat can be improved.

Although the aspects of the present disclosure have been described in detail, the scope of the present disclosure is not limited to these aspects, and various modifications and improvements devised by those skilled in the art using the fundamental concept of the present disclosure, further fall within the scope of the present disclosure.

What is claimed is:

1. A system for correcting a passenger's posture in an autonomous vehicle, the system comprising:
    a camera configured to measure a distance between a headrest and a head of a passenger;
    a plurality of body pressure sensors configured to be uniformly embedded across an entire area of a seat and sense body pressures of the passenger;
    a pressurizing device configured to be expandably installed inside a seatback and press between T10 and T12 of a thoracic spine of the passenger; and
    a controller configured to control an operation of the pressurizing device on the basis of the distance measured by the camera and a scapular pressure of the passenger, which is sensed by the plurality of body pressure sensors.

2. The system of claim 1, wherein the camera is installed at a position of a head lining, which corresponds to an upper side of the seat.

3. The system of claim 1, wherein the pressurizing device includes:
    a pair of rails configured to be installed at a seat back frame;
    a support plate configured to be vertically movably installed at the pair of rails;
    an air cell configured to be expandably installed at a front surface of the support plate; and
    a pump configured to supply air to the air cell and suction the air from the air cell.

4. The system of claim 3, wherein a rack is installed at a rear surface of the support plate, and a motor having a gear, which is engaged with the rack, as a shaft is installed at the seat back frame.

5. The system of claim 1, wherein the controller is further configured to act as:
    a posture determiner configured to determine whether a current posture of the passenger is a slouched-sitting posture on the basis of a signal for the distance measured by the camera and signals for the body pressures measured by the plurality of body pressure sensors;

a body size determiner configured to determine a body type of the passenger on the basis of a signal for a body pressure of a body pressure sensor which measures a scapular pressure of the passenger among the plurality of body pressure sensors;

an expansion amount determiner configured to determine an expansion amount of the pressurizing device when the current posture of the passenger is determined as the slouched-sitting posture as a determination result of the posture determiner;

a vertical position movement amount determiner configured to determine a vertical position movement distance of the pressurizing device on the basis of a body type determination result of the body size determiner; and a drive controller configured to drive the pressurizing device according to the expansion amount of the pressurizing device determined by the expansion amount determiner, and the vertical position movement amount determined by the vertical position movement amount determiner.

6. The system of claim 5, wherein, when the distance measured by the camera is out of a predetermined range and the scapular pressure of the passenger sensed by the body pressure sensor is less than or equal to a predetermined body pressure range, or the distance measured by the camera falls within the predetermined range and the scapular pressure of the passenger sensed by the body pressure sensor is less than or equal to the predetermined body pressure range, the posture determiner is configured to determine the current posture of the passenger as the slouched-sitting posture.

7. The system of claim 5, wherein the body size determiner is configured to:
determine a sitting height of the passenger from a generation position of the signal for the body pressure of the body pressure sensor measuring the scapular pressure of the passenger among the plurality of body pressure sensors, and then, determine that T10 to T12 of the thoracic spine of the passenger are present at positions in a range of 24 cm to 30 cm downward from the generation position of the signal for the body pressure of the body pressure sensor.

8. The system of claim 5, wherein the controller further includes a termination condition determiner configured to determine whether a process of correcting the passenger's posture is completed.

9. The system of claim 8, wherein the termination condition determiner is configured to: receive a signal of a vertical acceleration sensor and navigation information, and when a driving state including a severe road driving or a repeated turning are recognized, transmit a command signal to the drive controller to terminate the process of correcting the passenger's posture or contract an expanded air cell of the pressurizing device to its original position.

10. The system of claim 8, wherein, when a time for an air cell of the pressurizing device, which is expanded to press between T10 and T12 of the thoracic spine of the passenger, is greater than or equal to a predetermined time, the termination condition determiner is configured to transmit a command signal to the drive controller to contract the expanded air cell of the pressurizing device to its original position.

11. The system of claim 8, wherein, after an air cell of the pressurizing device is expanded to press between T10 to T12 of the thoracic spine of the passenger and the slouched-sitting posture of the passenger is corrected to an upright posture, and then a certain period of time is elapsed, the termination condition determiner is configured to transmit a command signal to the drive controller to contract the expanded air cell of the pressurizing device to its original position.

12. A system for correcting a passenger's posture in an autonomous vehicle, the system comprising:
a camera configured to measure a distance between a headrest and a head of a passenger;
a plurality of body pressure sensors configured to be uniformly embedded across an entire area of a seat and sense body pressures of the passenger;
a pressurizing device configured to be expandably installed inside a seatback and press between T10 and T12 of a thoracic spine of the passenger; and
a controller configured to control an operation of the pressurizing device based on the distance measured by the camera and a scapular pressure of the passenger, which is sensed by the plurality of body pressure sensors,
wherein the controller is further configured to act as:
a posture determiner configured to determine whether a current posture of the passenger is a slouched-sitting posture on the basis of a signal for the distance measured by the camera and signals for the body pressures measured by the plurality of body pressure sensors;
a body size determiner configured to determine a body type of the passenger on the basis of a signal for a body pressure of a body pressure sensor which measures a scapular pressure of the passenger among the plurality of body pressure sensors;
an expansion amount determiner configured to determine an expansion amount of the pressurizing device when the current posture of the passenger is determined as the slouched-sitting posture as a determination result of the posture determiner;
a vertical position movement amount determiner configured to determine a vertical position movement distance of the pressurizing device on the basis of a body type determination result of the body size determiner; and
a drive controller configured to drive the pressurizing device according to the expansion amount of the pressurizing device determined by the expansion amount determiner, and the vertical position movement amount determined by the vertical position movement amount determiner.

* * * * *